United States Patent [19]

Nicklas

[11] 4,171,005

[45] Oct. 16, 1979

[54] DIVERTER TUB SPOUT

[75] Inventor: James R. Nicklas, Greensburg, Ind.

[73] Assignee: Masco Corporation of Indiana, Taylor, Mich.

[21] Appl. No.: 892,936

[22] Filed: Apr. 3, 1978

[51] Int. Cl.² ............................................. A47K 3/22
[52] U.S. Cl. ...................................... 137/119; 137/469
[58] Field of Search ................................ 137/119, 467

[56] References Cited

U.S. PATENT DOCUMENTS

| 2,663,539 | 12/1953 | Kersten | 137/467 |
| 2,835,269 | 5/1958 | Seymour | 137/467 |
| 2,997,058 | 8/1961 | Hall | 137/467 X |
| 3,601,141 | 8/1971 | Kisko | 137/119 |

Primary Examiner—Harold W. Weakley

Attorney, Agent, or Firm—E. Dennis O'Connor

[57] ABSTRACT

A diverter tub spout for use in a bathtub installation including a shower head interconnected to a common source of water. A floating valve member is positioned within the spout water passage and is responsive to water pressure to abut a valve seat to close the passage. A valve control member capable of holding the valve member remote from the seat to permit water flow is held in the flow position by a manually operable stem in a manner that positively allows water flow regardless of the magnitude of water pressure. The stem easily may be positioned to allow the floating valve to close, diverting water from the spout to the shower head, but upon the water pressure dropping below a predetermined level, the tub spout parts will automatically return to their flow positions.

5 Claims, 3 Drawing Figures

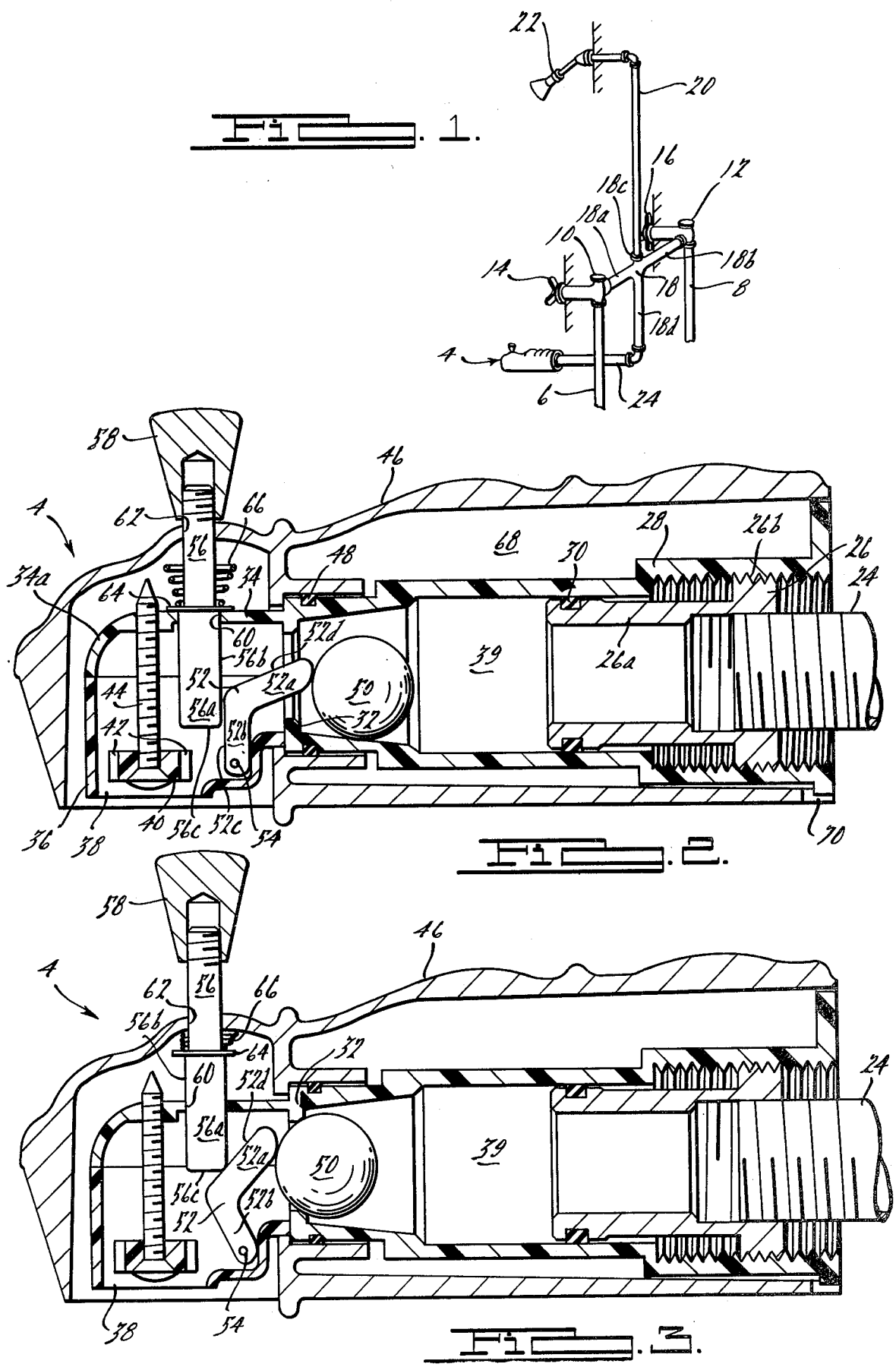

DIVERTER TUB SPOUT

BACKGROUND OF THE INVENTION

Diverter tub spouts are well known and commonly in use in bathtub plumbing arrangements including a shower head to divert water from the spout to the shower head when desired. Such diverter spouts eliminate the need for a separate spoutshower head selector control and allow savings on both installation and hardware costs. This water diversion from the tub spout to the shower head is provided, of course, by valve means that block water flow through the spout.

The plumbing fixtures art long has recognized the advantages in reliability and ease of manufacture of water passage closure valves utilizing a floating, ball shaped valve member that utilizes the pressure force of the flowing water to seat against a valve surface. An example of such a valve arrangement is disclosed in U.S. Pat. No. 2,128,627, issued Aug. 30, 1938. Also, closure valves utilizing this principal have been used in diverter tub spouts as may be seen from the disclosure of U.S. Pat. No. 2,663,539, issued Dec. 22, 1953.

Certain problems in operation have been encountered, however, during use by consumers of prior art diverter tub spouts relative to two desirable features for these plumbing hardware items. First, it is desirable that no unwanted interruption of water flow through the tub spout, and sudden discharge through the shower head be experienced. In diverter tub spouts using a true free floating valve member design, it is possible in situations where high water line pressure exists or pressure surges are encountered, for high water pressure or turbulence resulting therefrom to dislodge the floating valve member from its non-blocking storage position and result in an unwanted blockage of the spout water passage.

The prior art has taught the avoidance of this problem by the use of mechanical valve control structure to hold physically the valve member away from the seat in the non-blocking mode. It has been found, however, that certain designs with such structure allow unwanted spout blockage due to slippage of mechanical valve stops in high pressure, turbulence and vibration situations. Other mechanical valve control structure, such as is disclosed in the previously mentioned U.S. Pat. No. 2,128,627, positively maintain the floating valve member remote from the valve seat. But such arrangements do not provide a second feature desirable for diverter tub spouts. This feature is the automatic return of the valve member to the non-blocking mode from the blocking mode when water pressure in the spout is terminated or falls below a predetermined level. This automatic return feature prevents a startling shower head discharge when a tub user attempts to draw bath water following a shower by the preceding user.

It is, therefore, an object of this invention to provide a diverter tub spout that utilizes the floating valve principal to block water flow through the spout selectively, while eliminating the possibility of an unwanted blockage regardless of water passage pressure, turbulence or vibration conditions. Another object of this invention is to provide such a diverter tub spout wherein the floating valve member automatically moves from its water passage blocking position to a non-blocking position upon the water pressure in the spout water passage falling below a predetermined level. Still another object of this invention is the provision of a diverter tub spout having the advantages described above and that is simple in design, exonomical to manufacture and reliable in operation.

SUMMARY OF THE INVENTION

A diverter tub spout constructed in accordance with this invention includes a housing means defining a water passage therethrough and having an input opening for interconnection with a source of water under pressure and a water discharge opening remote from the input opening. A portion of the housing between the input and discharge openings defines a partial restriction in the water passage of reduced cross sectional area and comprises a valve seat. A floating valve member is positioned in the water passage between the seat and input opening and is movable in response to the force of pressurized water in the passage to abut the valve seat and block the passage against the flow of water therethrough. An elongate stem extends through the housing means from the passage to the exterior of the housing and is movable along its longitudinal axis. A valve control member within the passage has a pair of angularly disposed, elongate arms. One of the arms is pivotally secured to the housing such that the control member is movable between a first control member position wherein the other of the arms is positioned in a location between the valve member and the seat to maintain the valve member remote from the seat against the force of water pressure, and a second control member position permitting the valve member to abut the seat and block the passage. The elongate stem is movable to a first position to contact and maintain the control member in the first control member position and wherein the contact between the stem and control member occurs along an elongate dimension of the stem. Thus, the force of water pressure on the valve member is transmitted through the control member to the stem and acts on the stem in a direction perpendicular to the longitudinal axis of the stem.

DESCRIPTION OF THE DRAWINGS

FIG. 1 is a schematic representation of a typical bathtub plumbing installation including both a shower head and the diverter tube spout of this invention;

FIG. 2 is a side elevation view, partially in section, of the diverter tube spout of this invention showing the parts in a mode permitting water flow through the tube spout; and FIG. 3 is a view similar to FIG. 2 but showing the parts in a mode blocking water flow through the tube spout for diversion of the water to the shower head.

DETAILED DESCRIPTION OF THE INVENTION

Referring now in detail to the drawing, and in particular to FIG. 1 thereof, a diverter tub spout 4 constructed in accordance with this invention schematically is illustrated as mounted in a conventional bathtub plumbing arrangement including both a tub spout and a shower head. In this plumbing arrangement, a hot water pipe 6 and cold water pipe 8 are connected to pressurized sources of hot and cold water, respectively. The flow of water from pipes 6 and 8 is controlled by conventional water valves 10 and 12 having operating handles 14 and 16, respectively. A water pipe cross member 18 has an arm 18a connected to hot water control valve 10 and an arm 18b connected to cold water control valve 12. Arm 18c is connected to a composite conduit 20 leading to shower head 22, and arm 18d is connected to a composite water conduit 24 leading to diverter tub spout 4.

As is well known in the art, when valves 10 and/or 12 are open to permit water flow therethrough and the diverter tub spout 4 is in a mode permitting water flow through this spout, water discharged from hot and cold water pipes 6 and 8 will follow the path of least resistance through valves 10 and 12, cross 18, composite conduit 24 and spout 4 to be discharged in the bathtub located under the spout. When spout 4 is in a mode blocking water flow therethrough, water discharged from the hot and cold water pipes will follow conduit 20 and be discharged from shower head 22.

The details of the construction of the diverter tub spout 4 of this invention may be seen by reference to FIG. 2 which illustrates the parts of the spout in a mode permitting water flow therethrough into an associated bathtub. A generally cylindrical adaptor sleeve 26 has a portion of its internal bore threaded to receive external threads on the outer surface of supply conduit 24. The portion of adaptor 26 remote from conduit 24 is a sleeve 26a having an internal bore of reduced cross section. External threads 26b on adaptor 26 mate with internal threads formed on a generally sleeve-like guide body 28. An O-ring 30 mounted about sleeve 26a provides a water tight seal between adaptor 26 and guide body 28.

A portion of the internal bore of guide body 28 remote from adaptor 26 has a shoulder 32 extending from the side wall of guide body 28. This shoulder restricts the cross sectional area of the bore of guide body 28 and functions as a valve seat as will be explained in detail below. The bottom portion of guide body 28 terminates at shoulder 32, while the upper portion of the guide body continues as a projection 34 having its end closed by wall 34a. A support member 36 abuts the open end of projection 34 and has a downward facing opening 38 formed therein. In a manner that is conventional in the art, support member 36 includes a flow guide 40 positioned in the opening 38 and connected to the side walls of support member 36 by webs 42. The support member 36 is secured in the position shown in the drawing by a screw 44 that extends through member 40 and is received in projection 34.

The structure of spout 4 previously described thus defines a water passage 39 having an input opening at the end of conduit 24 and terminating at discharge opening 38.

An outer decorative housing 46, that may be molded from plastic material or formed from metal, with or without an outer decorative coating, surrounds the guide body 28. An O-ring 48 provides a water tight seal between outer housing 46 and guide body 28 proximate the shoulder 32. The outer housing 46 conveniently may be secured to guide body 28 by adhesives, sonic welding or any other known expedient, or simply may be held in place by the frictional forces provided due to the compression of the O-ring 48.

A spherical valve member 50 freely is positioned in passage 39 upstream from shoulder 32. An L-shaped valve control member 52 pivotally is mounted to support member 36 by a pivot pin 54 such that one of its arms 52a can extend through the restricted area of passage 39 defined by shoulder 32. The pivot pin 54 extends through the other of the arms 52b of valve control member 52.

An elongated valve operating stem 56 having a manual operating nob 58 secured to one end thereof extends through opening 60 in projection 34 and opening 62 in outer housing 46 such that nob 58 is located exterior of the outer housing and enlarged stem portion 56a is located at least partially within passage 39. A washer 64 is positioned about the body of stem 56 and rests on the shoulder defining the transition point between enlarged stem portion 56a and the stem portion of reduced diameter. Washer 64 thus is located between projection 34 and the inner wall of outer housing 46. A coil spring 66 surrounds stem 56 between washer 64 and the inner wall of housing 46. Stem 56 freely is movable along its longitudinal axis from a position wherein nob 58 abuts the outer surface of outer housing 46 (FIG. 1), and a position wherein coil spring 66 fully is compressed between washer 64 and the inner surface of outer housing 46 (FIG. 3).

Guide body 28 and outer housing 46 define between them a chamber 68. A drain opening 70 from chamber 68 is provided to allow the draining from spout 4 of water which may pass about the outer surface of stem 56 through aperture 60 and leak past O-ring 48.

The operation of diverter tube spout 6 is as follows. As may be seen from FIG. 2, when the parts of tub spout 4 are in a mode permitting water flow through passage 39 of the tub spout, arm 52a of control member 52 extends through the restricted cross sectional portion of passage 39 defined by shoulder 32. The relative orientation of the longitudinal axis of stem 56 and pivot pin 54 provides that when stem 56 is in the downward position of FIG. 2, the outer surface 52c of control member arm 52b lies flat along the outer surface 56b of stem portion 56a.

The pressure of water in passage 39 acts on valve member 50 and urges the valve member toward the left as viewed in FIG. 2. The valve member 50 is maintained against this water pressure remote from shoulder valve seat 32 by the arm 52a. The force of water pressure against the valve member is transmitted through member 52 to stem 56 which prevents movement of the control member from the position illustrated in FIG. 2. Since this force generated by water pressure is directed against stem 56 in a direction perpendicular to the longitudinal axis and axis of movement of the stem 56, there is no component of this force that would tend to move stem 56 from the position wherein blockage of the passage 39 by valve 50 may occur. Thus, despite high water pressures, pressure surges and vibrations in the plumbing system, the parts of diverter tub spout 4 will remain in a mode permitting flow through the tub spout, thus negating the possibility of an unexpected blockage of the passage 39.

In the event water discharge from shower head 22 is desired, the parts of tub spout 4 are placed in the blocking mode illustrated in FIG. 3 simply by a manual lifting of stem 56 against the force of gravity and the resilient force of spring 66. With stem 56 in the position of FIG. 3, a force of pressurized water on valve member 50 will cause the valve member to seat against shoulder 32 as the valve member forces a rotation of control member 52 counterclockwise as illustrated about the pivot pin 54. Spring 66 is chosen so that it has a resilient force in compression which, combined with the force of gravity on stem 56, is insufficient to overcome the water pressure acting on valve member 50.

As illustrated in FIG. 3, with passage 39 blocked by valve member 50, the end 56c of stem 56 rests against the outer surface 52d of control member arm 52a. This surface 52d is inclined approximately 45° from the horizontal so that the forces of gravity and spring 66 exerted on stem 56, which forces tend to move pin 56 downward, will overcome the water pressure force, if any, on valve member 50. Thus, member 52 will be forced to rotate clockwise from the position of FIG. 3 and into the position of FIG. 2 and passage 39 will be opened for the flow of water as stem 56 drops into the valve control member locking position of FIG. 2. This automatic return of the parts of tub spout 4 to the non-blocking position of FIG. 2 upon water pressure passage 39 falling below a predetermined level negates the possibility of a person who wished to draw water for a bath being startled by an unexpected discharge from shower head 22.

It thus may be seen that this invention provides a diverter tub spout that utilizes the floating valve principal to block water flow through the spout selectively, and eliminates the possibility of an unwanted blockage regardless of water pressure in the spout passage, turbulence or vibration conditions. Furthermore, the diverter tub spout of this invention includes the feature of automatic valve member movement from the water passage blocking position to a non-blocking position upon the pressure in the spout water passage falling below a predetermined level. Both of these advantages are accomplished by a diverter tub spout design that is quite simple, economical to manufacture and reliable in operation.

I claim:

1. A diverter tub spout including housing means defining a water passage therethrough and having an input opening for interconnection with a source of water under pressure and a water discharge opening remote from said input opening, a portion of said housing means between said input and discharge openings defining a partial restriction in said passage of reduced cross-sectional area and comprising a valve seat, a valve member freely positioned in said passage between said seat and said input opening and movable in response to the force of pressurized water in said passage to abut said seat and block said passage against the flow of water therethrough, an elongate stem extending through said housing means from said passage to the exterior of said housing means and being movable along its length, a valve control member within said passage and having a pair of angularly disposed elongate arms, one of said arms being pivotally secured to said housing such that said control member is movable between a first control member position wherein the other of said arms is positioned in a location between said valve member and said seat to maintain said valve member remote from said seat against the force of water pressure in said passage to permit water flow therethrough and a second control member position remote from said location and permitting said valve member to abut said seat to block said passage, said elongate stem being movable to a first stem position to contact and maintain said control member in the first control member position, and wherein the contact between said stem and control member occurs along an elongate dimension of said stem such that the force of water pressure on said valve member is transmitted through said control member to said stem and acts on said stem in a direction perpendicular to the path of movement of said stem.

2. The tub spout of claim 1 wherein the contact between the stem and control member in the first stem position and first control member position occurs along said one arm of said control member.

3. The tub spout of claim 1, wherein said stem is movable to a second stem position permitting movement of said control member to said second control member position wherein one end of said stem contacts the other of said arms of said control member.

4. The tub spout of claim 3, further including resilient means positioned to engage said stem and exerting a force on said stem when said stem is in the second stem position urging said stem toward said first stem position, the force exerted by said resilient means when said stem is in said second stem position being transmitted by said stem to said control member and acting on said other arm in a direction at an acute angle to the longitudinal axis of said other arm.

5. The tub spout of claim 4, wherein said elongate stem moves vertically whereby the force of gravity acts in concert with the force exerted by said resilient means to urge said stem toward said first stem position, and wherein said one arm is pivotally secured such that said valve control member is pivotally movable about a horizontal pivot axis.

* * * * *